US012606110B2

(12) United States Patent
Hwang

(10) Patent No.: US 12,606,110 B2
(45) Date of Patent: Apr. 21, 2026

(54) SMART VEHICLE CONTROL DEVICE AND METHOD

(71) Applicants:Hyundai Motor Company, Seoul (KR); Kia Corporation, Seoul (KR)

(72) Inventor: Sanghyun Hwang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 221 days.

(21) Appl. No.: 18/514,919

(22) Filed: Nov. 20, 2023

(65) Prior Publication Data

US 2025/0074344 A1    Mar. 6, 2025

(30) Foreign Application Priority Data

Sep. 1, 2023    (KR) ........................ 10-2023-0116376

(51) Int. Cl.
B60R 16/037    (2006.01)
B60R 25/20    (2013.01)
G06N 3/092    (2023.01)
G07C 9/00    (2020.01)

(52) U.S. Cl.
CPC .......... B60R 16/037 (2013.01); B60R 25/209 (2013.01); G06N 3/092 (2023.01); G07C 9/00309 (2013.01)

(58) Field of Classification Search
CPC ...... G07C 9/00; G07C 9/00309; B60R 25/00; B60R 16/00; B60R 16/037; B60R 25/209; G06N 3/08; G06N 3/092
USPC .......................................................... 701/2
See application file for complete search history.

(56) References Cited

U.S. PATENT DOCUMENTS

| 11,647,532 | B1 * | 5/2023 | Kaya ...................... | H04B 7/088 |
| | | | | 370/329 |
| 2012/0028680 | A1 * | 2/2012 | Breed ...................... | G01S 15/42 |
| | | | | 455/556.1 |
| 2015/0100530 | A1 * | 4/2015 | Mnih ....................... | G06N 3/08 |
| | | | | 706/25 |
| 2018/0293512 | A1 * | 10/2018 | Koseki ..................... | G06N 7/01 |
| 2020/0320611 | A1 * | 10/2020 | Price ................. | G06Q 30/0629 |
| 2021/0053418 | A1 * | 2/2021 | Kale ....................... | G06N 3/049 |
| 2022/0250583 | A1 * | 8/2022 | Garg ...................... | B60R 25/102 |
| 2022/0358316 | A1 * | 11/2022 | Zeng ....................... | B60R 99/00 |
| 2024/0232642 | A1 * | 7/2024 | van Hasselt .......... | G06N 3/092 |

FOREIGN PATENT DOCUMENTS

CN        116506965 A  *  7/2023  ............. G06N 3/092

OTHER PUBLICATIONS

CN116506965A—English Translation (Year: 2023).*

* cited by examiner

*Primary Examiner* — Erin M Piateski
*Assistant Examiner* — David Mesquiti Ovalle
(74) *Attorney, Agent, or Firm* — MORGAN, LEWIS & BOCKIUS LLP

(57)        ABSTRACT

Provided is a smart vehicle control device including: a user input receiver receiving a user input from a user terminal through a digital key application; a vehicle input receiver receiving a vehicle input input from a vehicle by a user boarding on the vehicle; a reinforcement learning model generating a vehicle control policy for vehicle driving preparation through reinforcement learning based on the user input and the vehicle input; and a vehicle controller configured for controlling the vehicle based on the vehicle control policy.

13 Claims, 9 Drawing Sheets

FIG. 5

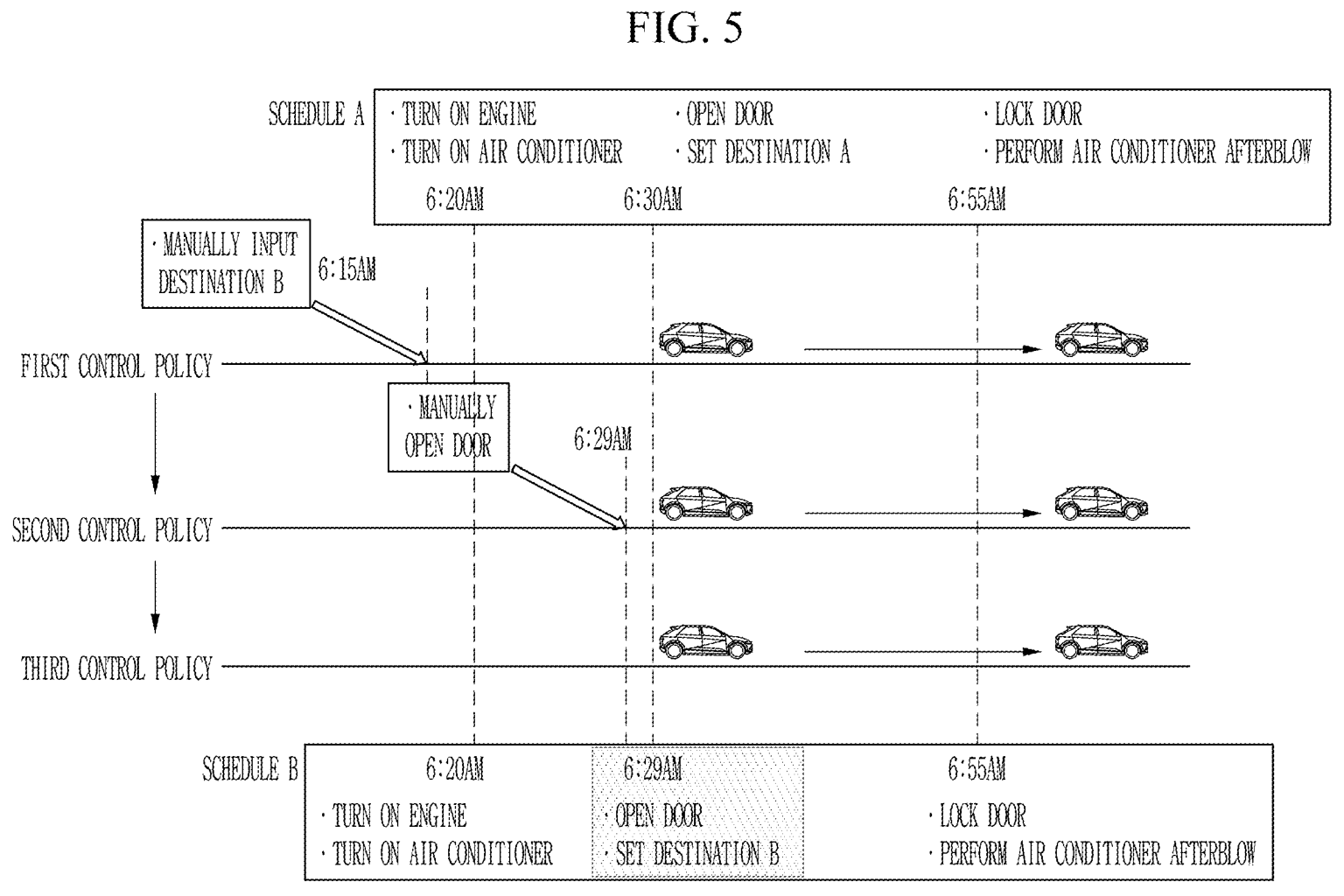

SCHEDULE A

| 6:20AM | 6:30AM | 6:55AM |
|---|---|---|
| · TURN ON ENGINE<br>· TURN ON AIR CONDITIONER | · OPEN DOOR<br>· SET DESTINATION A | · LOCK DOOR<br>· PERFORM AIR CONDITIONER AFTERBLOW |

· MANUALLY INPUT
  DESTINATION B    6:15AM

· MANUALLY
  OPEN DOOR

6:29AM

FIRST CONTROL POLICY →

SECOND CONTROL POLICY →

THIRD CONTROL POLICY

SCHEDULE B

| 6:20AM | 6:29AM | 6:55AM |
|---|---|---|
| · TURN ON ENGINE<br>· TURN ON AIR CONDITIONER | · OPEN DOOR<br>· SET DESTINATION B | · LOCK DOOR<br>· PERFORM AIR CONDITIONER AFTERBLOW |

FIG. 6

SCHEDULE A

| MON. | TUES. | WED. | THURS. | FRI. | SAT. |
|------|-------|------|--------|------|------|
| 6:20AM<br>TURN ON ENGINE, AUTOMATICALLY TURN ON AIR CONDITIONER, OPEN DOOR AND SET AVN<br>(E.G., DESTINATION A AND MEDIA 1) 10 MINUTES LATER | | | | | |
| 6:55AM<br>PERFORM AIR CONDITIONER AFTERBLOW FOR 5 MINUTES, CLOSE DOOR 2 MINUTES LATER | | | | | |
| | | | | | |

SCHEDULE B

| MON. | TUES. | WED. | THURS. | FRI. | SAT. |
|------|-------|------|--------|------|------|
| 6:55AM<br>TURN ON ENGINE, AUTOMATICALLY TURN ON AIR CONDITIONER, OPEN DOOR AND SET AVN,<br>(E.G., DESTINATION B AND MEDIA 1) 9 MINUTES LATER | | | | | |
| 6:55AM<br>PERFORM AIR CONDITIONER AFTERBLOW FOR 5 MINUTES, CLOSE DOOR 2 MINUTES LATER | | | | | |
| | | | | | |

FIG. 7

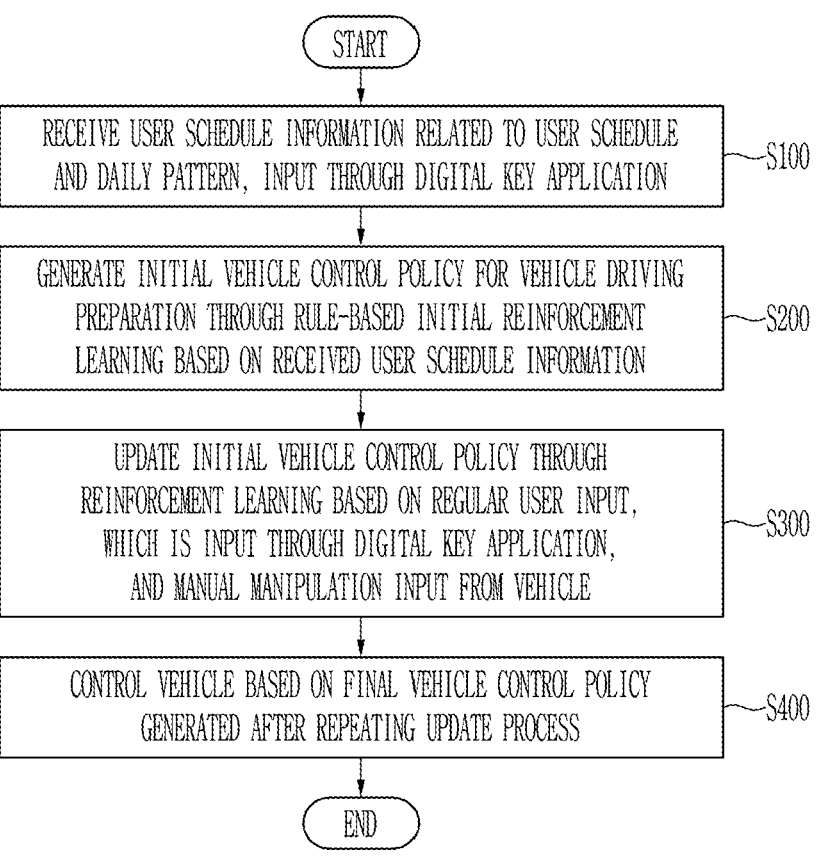

START

RECEIVE USER SCHEDULE INFORMATION RELATED TO USER SCHEDULE AND DAILY PATTERN, INPUT THROUGH DIGITAL KEY APPLICATION ⌐S100

GENERATE INITIAL VEHICLE CONTROL POLICY FOR VEHICLE DRIVING PREPARATION THROUGH RULE-BASED INITIAL REINFORCEMENT LEARNING BASED ON RECEIVED USER SCHEDULE INFORMATION ⌐S200

UPDATE INITIAL VEHICLE CONTROL POLICY THROUGH REINFORCEMENT LEARNING BASED ON REGULAR USER INPUT, WHICH IS INPUT THROUGH DIGITAL KEY APPLICATION, AND MANUAL MANIPULATION INPUT FROM VEHICLE ⌐S300

CONTROL VEHICLE BASED ON FINAL VEHICLE CONTROL POLICY GENERATED AFTER REPEATING UPDATE PROCESS ⌐S400

END

FIG. 8

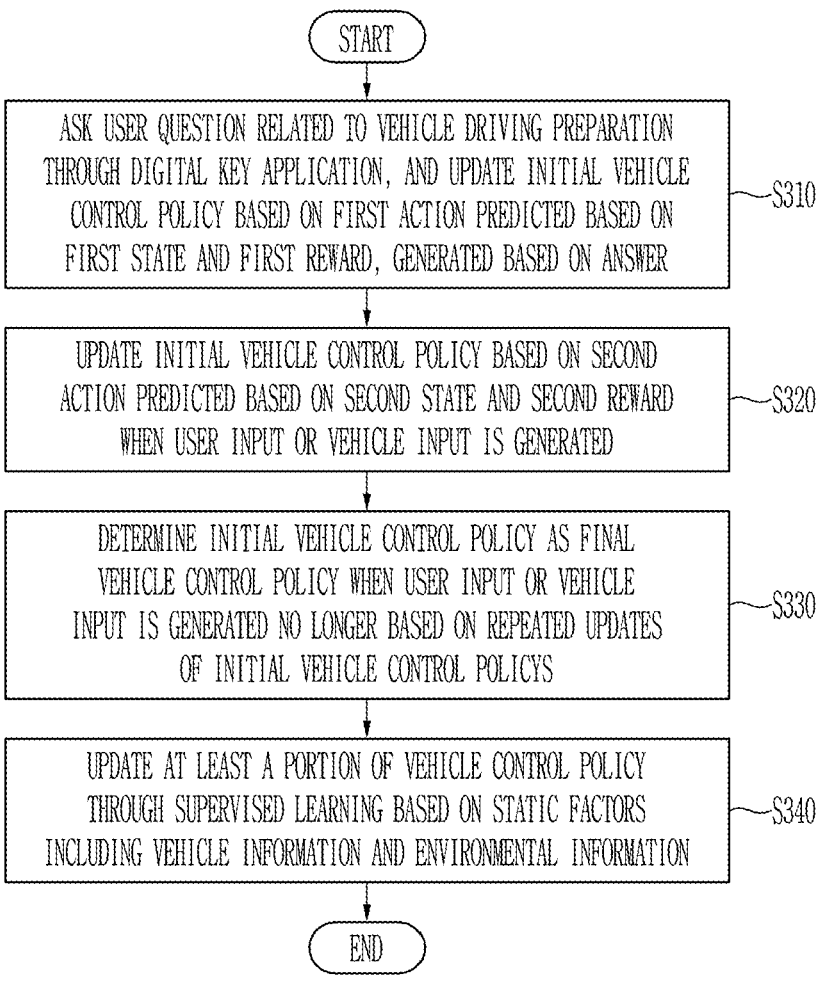

START

ASK USER QUESTION RELATED TO VEHICLE DRIVING PREPARATION THROUGH DIGITAL KEY APPLICATION, AND UPDATE INITIAL VEHICLE CONTROL POLICY BASED ON FIRST ACTION PREDICTED BASED ON FIRST STATE AND FIRST REWARD, GENERATED BASED ON ANSWER —S310

UPDATE INITIAL VEHICLE CONTROL POLICY BASED ON SECOND ACTION PREDICTED BASED ON SECOND STATE AND SECOND REWARD WHEN USER INPUT OR VEHICLE INPUT IS GENERATED —S320

DETERMINE INITIAL VEHICLE CONTROL POLICY AS FINAL VEHICLE CONTROL POLICY WHEN USER INPUT OR VEHICLE INPUT IS GENERATED NO LONGER BASED ON REPEATED UPDATES OF INITIAL VEHICLE CONTROL POLICYS —S330

UPDATE AT LEAST A PORTION OF VEHICLE CONTROL POLICY THROUGH SUPERVISED LEARNING BASED ON STATIC FACTORS INCLUDING VEHICLE INFORMATION AND ENVIRONMENTAL INFORMATION —S340

END

SMART VEHICLE CONTROL DEVICE AND METHOD

CROSS-REFERENCE TO RELATED APPLICATION

The present application claims priority to Korean Patent Application No. 10-2023-0116376 filed on Sep. 1, 2023, the entire contents of which is incorporated herein for all purposes by this reference.

BACKGROUND OF THE PRESENT DISCLOSURE

Field of the Present Disclosure

The present disclosure relates to smart vehicle control device and method, and more particularly, to smart vehicle control device and method which may be actively operated in a vehicle through learning of a user pattern.

DESCRIPTION OF RELATED ART

A digital key is technology replacing a traditional physical key, allowing a user to perform a function such as locking or unlocking a vehicle or starting an engine by use of a smartphone or another digital device. The digital key may provide a function to access, start, or control the vehicle by use of the smartphone or another digital device. Digital key technology may not have an artificial intelligence (AI) on its own. However, when combined with the AI, the present technology may provide the user with greater convenience and personalization in using the vehicle.

Conventionally, even when using the digital key, the user may have inconvenience such as having to go directly to a parking lot and tag his or her smartphone to perform vehicle departure. Therefore, there is a demand for technology in which the artificial intelligence and a user authentication technique of the digital key are combined with each other to promote the user convenience, such as having the vehicle actively prepare for its departure when the user wants to the vehicle departure.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing smart vehicle control device and method which may actively perform vehicle control for vehicle driving preparation through reinforcement learning of the user daily pattern.

The present disclosure attempts to provide smart vehicle control device and method which may output an active vehicle control schedule for the vehicle driving preparation based on an input schedule when a user inputs the user schedule through a digital key application that allows the user to input/output his or her schedule, and may optimize the output active control schedule by repeatedly updating the schedule through reinforcement learning using an artificial intelligence.

According to an exemplary embodiment of the present disclosure, a smart vehicle control device includes: a user input receiver receiving a user input from a user terminal through a digital key application; a vehicle input receiver receiving a vehicle input input from a vehicle by a user boarding on the vehicle; a reinforcement learning model generating a vehicle control policy for vehicle driving preparation through reinforcement learning based on the user input and the vehicle input; and a vehicle controller configured for controlling the vehicle based on the vehicle control policy.

The device may further include a supervised learning model updating at least a portion of the vehicle control policy through supervised learning based on static factors including vehicle information and environmental information in addition to factors caused by the user input and the vehicle input.

The supervised learning model may be configured to determine a first weight of the vehicle control policy for a schedule and a second weight of the vehicle control policy for each of the static factors, and update the schedule only when the second weight is greater than the first weight.

The reinforcement learning model may be configured to generate an initial vehicle control policy through rule-based modeling based on the user input including information on a user schedule and a user daily pattern.

The user input receiver may receive a user answer to a question related to the vehicle driving preparation provided to the user through the digital key application, the reinforcement learning model may update the initial vehicle control policy by performing the learning based on a first state and a first reward, generated based on the received answer, and the first reward may include a value less than zero, and include a value of zero when the reinforcement learning model does not receive the user answer.

The user input receiver may receive real-time user input related to the vehicle driving preparation through the digital key application, the reinforcement learning model may update the initial vehicle control policy by performing the learning based on a second state and a second reward, generated based on the real-time input, and the second reward may include a value smaller than a value of the first reward, and include the value of zero when the reinforcement learning model does not receive the real-time user input.

The vehicle input receiver may receive the vehicle input which is input from the vehicle by the user boarding on the vehicle, the reinforcement learning model may update the initial vehicle control policy by performing the learning based on a third state and a third reward, generated based on the vehicle input, and the third reward may include a value smaller than a value of the second reward, and include the value of zero when the reinforcement learning model does not receive the vehicle input.

The reinforcement learning model may be configured to generate the vehicle control policy by repeatedly updating the initial vehicle control policy for the reward including the first, second, and third rewards to include a maximum value, and the reward may include the maximum value when the reinforcement learning model receives none of the user answer, the real-time user input, and the vehicle input.

The reinforcement learning model may include a deep Q network (DQN).

The reinforcement learning model may perform the learning to reduce a loss which is a difference between an actual value Q-target of the vehicle control policy which is calculated through the DQN and a predicted value Q predict of each of the repeatedly updated initial vehicle control policies, and determine the initial vehicle control policy as the vehicle control policy when the loss includes a minimum value.

According to another exemplary embodiment of the present disclosure, a smart vehicle control method includes receiving, by a smart vehicle control device, a user input input from a user terminal through a digital key application; receiving, by the smart vehicle control device, a vehicle input from a vehicle by a user boarding on the vehicle; performing, by the smart vehicle control device, reinforcement learning based on the user input and the vehicle input by use of a reinforcement learning model, and generating, by the smart vehicle control device, a vehicle control policy for vehicle driving preparation; and controlling, by the smart vehicle control device, the vehicle based on the vehicle control policy.

The method may further include updating at least a portion of the vehicle control policy through supervised learning based on static factors including vehicle information and environmental information in addition to factors caused by the user input and the vehicle input.

In the generating of the vehicle control policy, an initial vehicle control policy may be generated by the reinforcement learning model through rule-based modeling based on the user input including information on a user schedule and a user daily pattern.

The reinforcement learning model may include a deep Q network (DQN).

In the receiving of the user input, a user answer to a question related to the vehicle driving preparation provided to the user may be received through the digital key application, and the generating of the vehicle control policy may further include updating, by the reinforcement learning model, the initial vehicle control policy by performing the learning based on a first state and a first reward, generated based on the received answer.

The receiving of the user input may further include receiving real-time user input related to the vehicle driving preparation through the digital key application, and the generating of the vehicle control policy may further include updating, by the reinforcement learning model, the initial vehicle control policy by performing the learning based on a second state and a second reward, generated based on the real-time input.

The receiving of the user input may further include receiving the vehicle input which is input from the vehicle by the user boarding on the vehicle, and the generating of the vehicle control policy may further include updating, by the reinforcement learning model, the initial vehicle control policy by performing the learning based on a third state and a third reward, generated based on the vehicle input.

The first reward may include a value less than zero, the second reward may be less than the first reward, the third reward may be less than the second reward, and the first reward may include a value of zero when the user answer is not received, the second reward may include the value of zero when the real-time user input is not received, and the third reward include the value of zero when the vehicle input is not received.

In the generating of the vehicle control policy, the initial vehicle control policy may be determined as a final vehicle control policy when the reward including the first, second, and third rewards includes a maximum value, and the reward may include the maximum value when none of the user answer, the real-time user input, and the vehicle input is received.

In the generating of the vehicle control policy, the reinforcement learning may be performed to minimize a loss which is a difference between an actual value Q-target of the final vehicle control policy which is pre-calculated through the DQN and a predicted value Qpredict of the initial vehicle control policy which is predicted through the DQN.

The smart vehicle control device and method according to an exemplary embodiment of the present disclosure may actively perform the vehicle control for the vehicle driving preparation through the reinforcement learning of the user schedule or daily pattern input through the digital key application.

The smart vehicle control device and method according to an exemplary embodiment of the present disclosure may generate the vehicle control schedule for optimally corresponding to the user schedule or daily pattern through the repetitive learning using the reinforcement learning model.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 5 is a view showing an example of smart vehicle control according to an exemplary embodiment of the present disclosure.

FIG. 6 shows an input or output screen of the user schedule according to an exemplary embodiment of the present disclosure.

FIG. 7 is a flowchart showing a smart vehicle control method according to another exemplary embodiment of the present disclosure.

FIG. 8 is a flowchart showing the smart vehicle control method according to another exemplary embodiment of the present disclosure.

Figure 1:
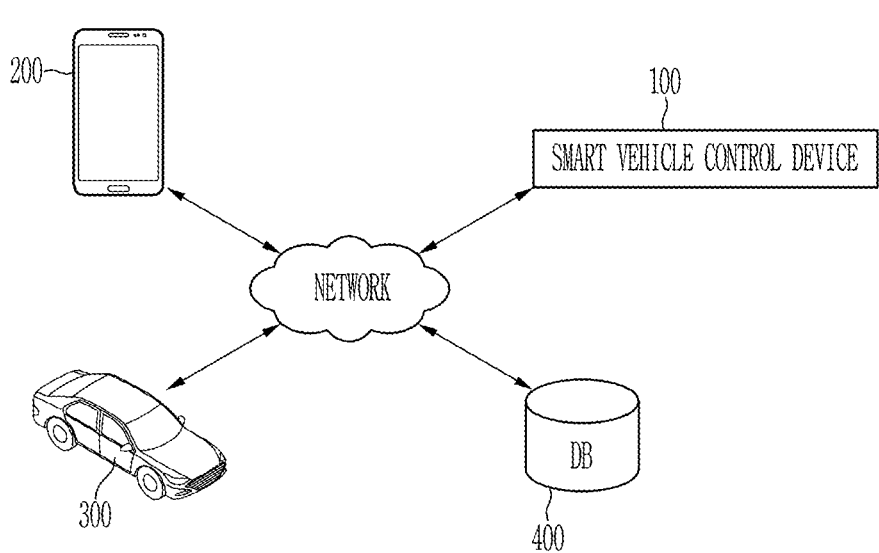
FIG. 1 schematically shows a smart vehicle control system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings so that those skilled in the art to which the present disclosure pertains may easily practice the present disclosure. However, the present disclosure may be modified in various different forms, and is not limited to the exemplary embodiments provided in the specification. Furthermore, in the drawings, portions unrelated to the description are omitted to clearly describe the present disclosure, and similar portions are denoted by similar reference numerals throughout the specification.

Through the present specification and claims, unless explicitly described otherwise, "including" any components will be understood to imply the inclusion of other components rather than the exclusion of any other components. Terms including ordinal numbers such as "first," "second" and the like, may be used to describe various components. However, these components are not limited by these terms. The terms are used only to distinguish one component from another component.

Terms such as "~part", "~er/or", and "module" described in the specification may refer to a unit configured for processing at least one function or operation described in the specification, which may be implemented as hardware, a circuit, software, or a combination of hardware or circuit and software.

Hereinafter, the present disclosure is described in detail with reference to the accompanying drawings.

FIG. 1 schematically shows a smart vehicle control system according to an exemplary embodiment of the present disclosure.

Referring to FIG. 1, the smart vehicle control system may include a smart vehicle control device 100, a user terminal 200, a vehicle terminal 300, and a database 400.

The smart vehicle control device 100 may actively control a vehicle through reinforcement learning using an artificial intelligence for user schedule and daily pattern. The smart vehicle control device 100 may provide a smart vehicle control function evolved and optimized over time by use of reinforcement learning. The smart vehicle control device 100 may be configured to generate a vehicle control policy for vehicle driving preparation which is optimized through the reinforcement learning based on user input and vehicle input, respectively input through the user terminal 200 and the vehicle terminal 300. The smart vehicle control device 100 may actively control the vehicle with the optimized vehicle control policy.

The smart vehicle control device 100 may be connected to a built-in system of the vehicle that includes a computer system in the vehicle. The computer system in the vehicle may receive a signal or an instruction from the smart vehicle control device 100, and perform a task such as locking or unlocking the vehicle or starting an engine. The smart vehicle control device 100 may be connected to the built-in system through a Controller Area Network (CAN) bus of the vehicle, and may communicate with another part of the vehicle.

The user terminal 200 may be a smart device including processor, memory, and communication functions, such as a smartphone, a tablet personal computer (PC), a laptop PC, or a desktop PC. The user terminal 200 may provide a user with an app or application that functions as a digital key wirelessly controlling the vehicle. The digital key may replace or assist an actual vehicle key for the user's convenience. For example, the digital key may open a vehicle door and start the engine by use of wireless communication of the user terminal 200.

The user terminal 200 may be the user's mobile device, mainly including the smartphone or the tablet PC. The user terminal 200 may have display and input functions. The user terminal 200 may provide the user with an interface for vehicle control, such as starting the engine, opening the door, playing music, or turning on an air conditioner, through a digital key application. That is, the user may manually control the vehicle through the digital key application provided on the user terminal 200.

In an exemplary embodiment of the present disclosure, the user terminal 200 may provide the interface for the user to input information related to the user schedule and/or daily pattern through the digital key application. The user terminal 200 may be connected to the smart vehicle control device 100 through a network including wired or wireless communication, and provide the smart vehicle control device 100 with the information related to the user schedule and/or daily pattern which is input through the digital key application.

The vehicle terminal 300 may include the built-in system of the vehicle that includes the computer system in the vehicle. The vehicle terminal 300 may provide the user with an environment for his or her manual input to directly manipulate the vehicle, such as opening the vehicle door, starting the engine, playing music, or manipulating the air conditioner. That is, the vehicle terminal 300 may be connected to the smart vehicle control device 100 and the user terminal 200 through the network by use of the built-in computer system of the vehicle.

The database 400 may be connected to the smart vehicle control device 100 through the network, and store environmental information necessary for the smart vehicle control device 100 that includes the user schedule, pattern information, or weather, and information related to the vehicle such as a vehicle specification or a vehicle position. The database 400 may store various data necessary for the reinforcement learning and supervised learning, using the artificial intelligence.

Figure 2:
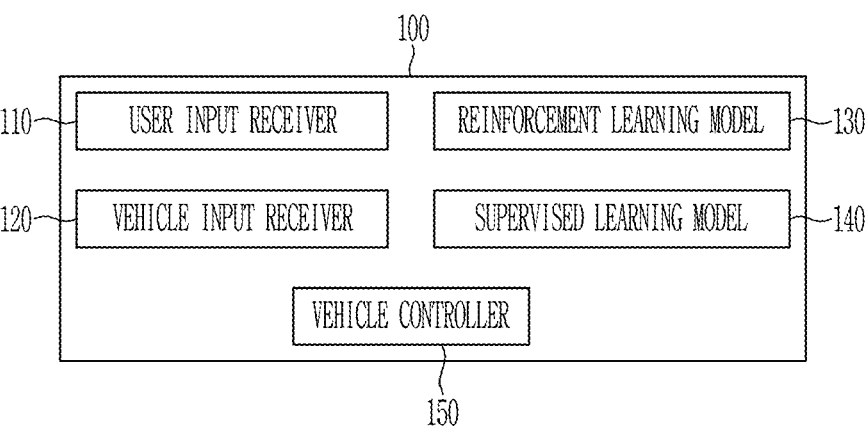
FIG. 2 is a block diagram of the smart vehicle control device according to an exemplary embodiment of the present disclosure.
Figure 3:
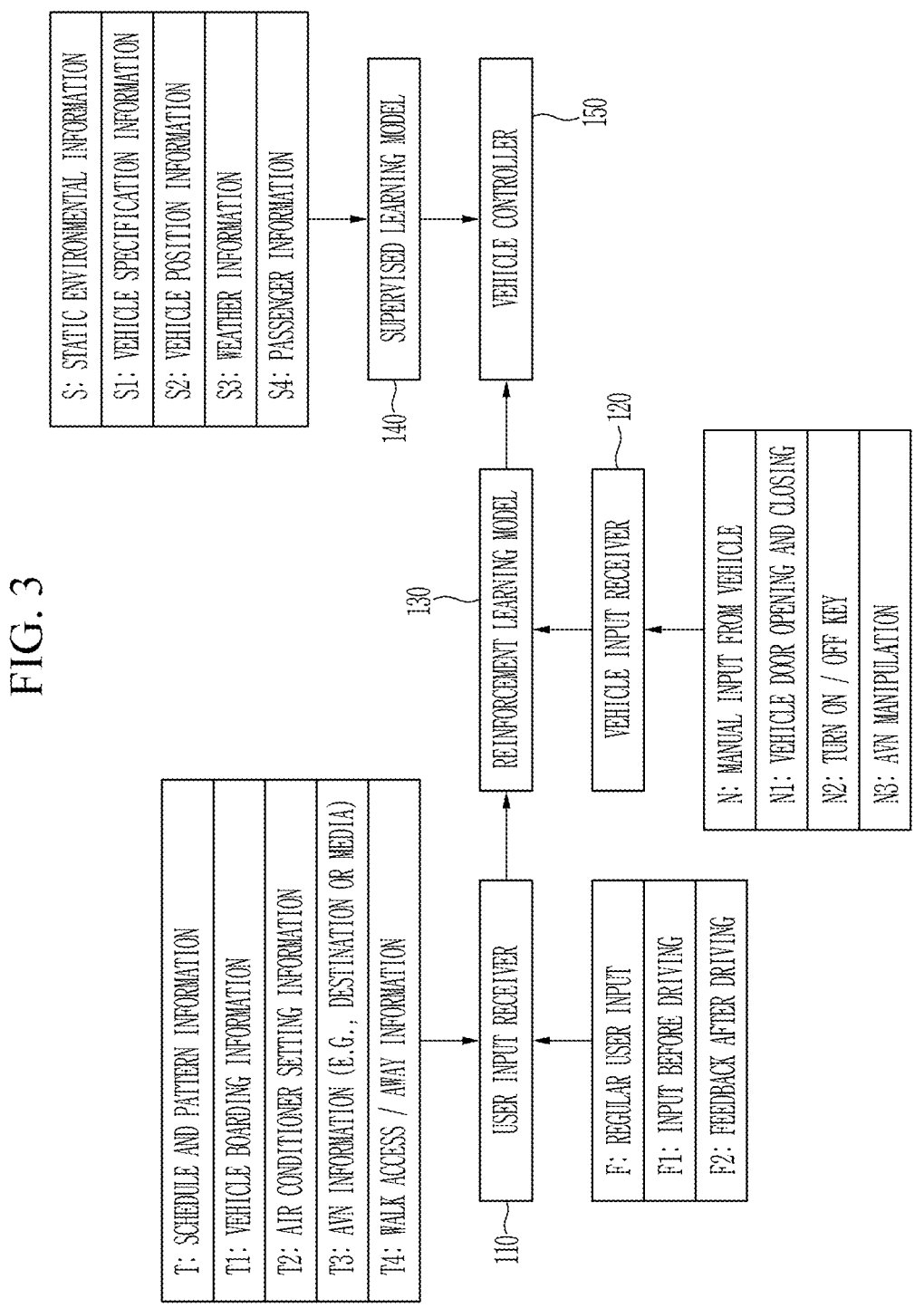
FIG. 3 is a view showing the block diagram of FIG. 2.

FIG. 2 is a block diagram of the smart vehicle control device according to an exemplary embodiment of the present disclosure. FIG. 3 is a view showing the block diagram of FIG. 2.

Referring to FIG. 2 and FIG. 3, the smart vehicle control device 100 may include a user input receiver 110, a vehicle input receiver 120, a reinforcement learning model 130, a supervised learning model 140, and a vehicle controller 150.

The user input receiver 110 may receive the user input including information related to the user, such as the user schedule or user daily pattern, input through the digital key application. For example, the user input receiver 110 may receive schedule and daily pattern information T such as vehicle boarding information T1, air conditioner setting information T2, audio, video, and navigation (AVN) information T3, and vehicle-door walk access/away information T4.

The user input receiver 110 may receive a user answer to a question related to the vehicle driving preparation provided to the user through the digital key application. The user input receiver 110 may receive the user answer from the reinforcement learning model 130 when the user inputs the answer to the question provided to the user through the digital key application. Furthermore, the user input receiver 110 may receive real-time user input related to the vehicle driving preparation through the digital key application. The real-time user input may be schedule update information including a change in a user destination, a change in vehicle boarding time, or the like, which is regularly input by the user and separate from the user pre-input schedule. For example, regular user input F may include input F1 before the user's vehicle driving or boarding and input F2 for feedback after the driving.

The vehicle input receiver 120 may receive the vehicle input that the user inputs from the vehicle. The vehicle input may refer to manual input N by manual manipulation of the user boarding the vehicle, such as vehicle door opening N1, starting the engine N2, or playing music or turning on the air conditioner N3.

The reinforcement learning model 130 may be configured to generate the vehicle control policy for the vehicle driving preparation through the reinforcement learning based on the user input and the vehicle input.

In various exemplary embodiments of the present disclosure, the smart vehicle control device 100 may be implemented in a form of hardware or software, or may be implemented in a combination of hardware and software.

According to an exemplary embodiment of the present disclosure, each of the user input receiver 110, the vehicle input receiver 120, the reinforcement learning model 130, the supervised learning model 140, and the vehicle controller 150 may be implemented by a processor (e.g., computer, microprocessor, CPU, ASIC, circuitry, logic circuits, etc.). Each of the user input receiver 110, the vehicle input receiver 120, the reinforcement learning model 130, the supervised learning model 140, and the vehicle controller 150 may be implemented by a non-transitory memory storing, e.g., a program(s), software instructions reproducing algorithms, etc and a processor configured to execute the program(s), software instructions reproducing algorithms, etc. Alternatively, the user input receiver 110, the vehicle input receiver 120, the reinforcement learning model 130, the supervised learning model 140, and the vehicle controller 150 may be integrated in a single processor.

The reinforcement learning may be a form of machine learning, and may indicate that a software agent learns a method to choose an action in the environment and maximize a resulting reward. The reinforcement learning may be accomplished through a series of trial and error. The agent may randomly choose an action, and learn to choose a better action as the agent accumulates useful information (that is, reward) over time. Here, the agent may refer to the reinforcement learning model 130.

One of key concepts in the reinforcement learning may be a "policy."

The policy may define a method of the agent determining which action to choose in a provided state. The policy may be fixed or changed over time. The reinforcement learning may include a goal to find the policy for maximizing the reward.

Another important concept in the reinforcement learning may be a "value function."

The value function may be a function for predicting a "value" of a specific state or a "value" of a specific action, usually based on an expected future reward. The agent may use the value function to choose the most valuable action among several possible actions. That is, the agent may choose a strategy or the policy which may yield the maximum reward in a long term rather than pursuing the reward in a short term.

In an exemplary embodiment of the present disclosure, the reinforcement learning model 130 may be configured to generate the vehicle control policy for choosing an optimal action that maximizes the reward in various states provided based on the user input and/or the vehicle input. The reinforcement learning model 130 may use the value function to generate the vehicle control policy for choosing the action including the highest value among the plurality of actions.

The reinforcement learning model 130 may be configured to generate an initial vehicle control policy through rule-based modeling based on the user input including the information related to the user schedule and daily pattern. The reinforcement learning model 130 may be configured to generate a final vehicle control policy through the repeated reinforcement learning based on the initial vehicle control policy. The initial vehicle control policy may be generated based on the information related to the user schedule and daily pattern input for the first time through the user's digital key application.

The rule-based modeling may be one of strategies commonly used in the reinforcement learning. The rule-based modeling may utilize prior knowledge related to the user and vehicle to define an initial vehicle action policy or the initial vehicle control policy through the artificial intelligence. That is, the initial vehicle control policy may be generated based on the user schedule, action pattern, daily pattern, and vehicle usage pattern that are well-known.

The rule-based modeling may be more efficient than having the agent randomly choose the action at the beginning of the reinforcement learning, and then optimizing the reward through a learning curve. The reason is that the rule-based modeling is based on pre-input information related to the user daily pattern and the vehicle usage pattern corresponding thereto. For example, the rule-based modeling may reasonably determine the user's vehicle boarding time and vehicle departure time based on the user's work schedule. Therefore, the rule-based modeling may rapidly and appropriately set time to open the vehicle door and time to start the engine.

In an exemplary embodiment of the present disclosure, the reinforcement learning model 130 may include a deep Q network (DQN). The reinforcement learning model 130 may be configured to generate the final vehicle control policy through the DQN from the initial vehicle control policy. That is, the reinforcement learning model 130 may be configured to generate an optimal vehicle control policy based on the user input and vehicle input by use of the DQN.

The DQN may be a method of the reinforcement learning, and may be combination of deep learning and Q-learning. A core idea of the DQN is to use a deep neural network to obtain an approximation of a Q-function. The Q-function indicates prediction of a future total reward which may be obtained by taking a specific action in the provided state.

Originally, the Q-learning may use a method of storing and updating Q-values of all possible state-action pairs in a table. However, the DQN may use the neural network to obtain the approximation of the Q-function, and predict the Q-value of each action in the provided state.

In the DQN, the neural network may be configured to predict the present Q-value, which may be referred to as Qpredict or a predicted Q-value. A Q-target may be the sum of the reward for an actual action performed by the agent and the highest Q-value in a next state, and assumed to be close to an optimal Q-value. A discounting factor may be applied to the present assumption, and a future reward may be treated as slightly less important than a current reward. That is, a rank of the rewards may follow a time order, and the reward generated later may thus be less than the reward generated earlier. For example, a size of a first reward for the regular user input before the user boards the vehicle may be greater than a size of a second reward for the vehicle input after the user boards the vehicle.

The Q-target may be an actual Q-value for the specific action in the specific state. The Qpredict may be the Q-value predicted for the specific action in the same specific state by the DQN.

A difference between the Qpredict and the Q-target may be used to generate a loss which is a measured value indicating how well the neural network predicts an agent action. A learning goal of the DQN is to minimize the loss. Accordingly, the agent may be configured to predict and choose the better action over time.

The reinforcement learning model 130 may be configured to generate the vehicle control policy to predict and choose the action for optimal vehicle control based on the user input and the vehicle input by use of the reinforcement learning through the DQN. For example, the reinforcement learning model 130 may learn to reduce the loss which is the difference between the actual value Q-target of the vehicle control policy which is determined through the DQN and a predicted value Qpredict of each of the repeatedly updated initial vehicle control policies. That is, the reinforcement learning model 130 may perform the learning for the initial vehicle control policy to be the same as the final vehicle control policy that provides the optimal vehicle control through the repeated updates of the initial vehicle control policy.

The supervised learning model 140 may update at least a portion of the vehicle control policy through the supervised learning based on static factors including the vehicle information and the environmental information in addition to factors caused by the user input and the vehicle input. The supervised learning may be a type of machine learning in which a model perform learning based on learning data provided input and corresponding output, and predicts appropriate output for new input. The supervised learning may be a learning method in which a label which may be considered to be a correct answer is provided when the model makes the prediction.

For example, the supervised learning model 140 may variably determine the time to start the engine or time to operate the air conditioner based on the factors such as the vehicle position or the weather, regardless of the user input or the vehicle input. That is, the static factors may be fixed environmental factors which include the vehicle position, an outside temperature, or the weather. The supervised learning model 140 may perform the learning based on the learning data related to the vehicle position and a label thereto, that is, the time to start the engine.

The supervised learning model 140 may receive data on a distance between the user and the vehicle based on the vehicle specification, the weather, and the vehicle position from the database 400 (see FIG. 1), perform the learning based thereon, and update the vehicle control policy to reflect the present learning.

The supervised learning model 140 may variably determine a vehicle cooling temperature in relation to the outside temperature through the learning. Alternatively, the supervised learning model 140 may variably determine a set value of a vehicle engine preheating time based on the outside temperature. The supervised learning model 140 may change the vehicle control policy based on the variably determined cooling temperature and/or engine preheating time.

In an exemplary embodiment of the present disclosure, the supervised learning model 140 may be configured to determine a first weight of the vehicle control policy for the schedule and a second weight of the vehicle control policy for each of the static factors. For example, the supervised learning model 140 may be configured to determine the first weight for the vehicle engine start schedule to include a larger value than a value of the second weight for the engine preheating time varied based on the outside temperature.

The supervised learning model 140 may update an existing schedule of the vehicle control policy by reflecting the static factor only when the second weight is greater than the first weight. That is, the supervised learning model 140 does not update the vehicle control policy based on the supervised learning when the first weight for the vehicle engine start schedule is greater than the second weight for the engine preheating time based on the outside temperature.

The supervised learning model 140 may consider a weight when reflecting, on the vehicle control policy, a set value of the cooling temperature based on the outside temperature, which is variably determined based on the learning. For example, the supervised learning model 140 may compare the first weight for the engine start time, which is one of the vehicle schedules in the existing vehicle control policy, with the second weight set for the cooling temperature based on the outside temperature, and update the cooling temperature based on the outside temperature when the second weight is greater than the first weight.

The supervised learning model 140 may set the second weight to (1−first weight). For example, the second weight may be determined to be 0.6 when the first weight is 0.4.

The supervised learning model 140 may update the cooling temperature or the engine preheating time based on a formula of (second weight×static factor+first weight×vehicle schedule). That is, the supervised learning model 140 may update the vehicle policy by reflecting the outside temperature at a rate of 40% and the existing vehicle schedule at a rate of 60%.

The vehicle controller 150 may be configured for controlling the vehicle based on the vehicle control policy generated by the reinforcement learning model 130. The vehicle controller 150 may be configured for controlling the vehicle based on the final vehicle control policy generated and updated respectively by the reinforcement learning model 130 and the supervised learning model 140. That is, the vehicle controller 150 may be configured for controlling the vehicle based on the final vehicle control policy determined by reflecting a result in which the supervised learning model 140 performs the learning on the vehicle control policy generated by the reinforcement learning model 130.

Figure 4:
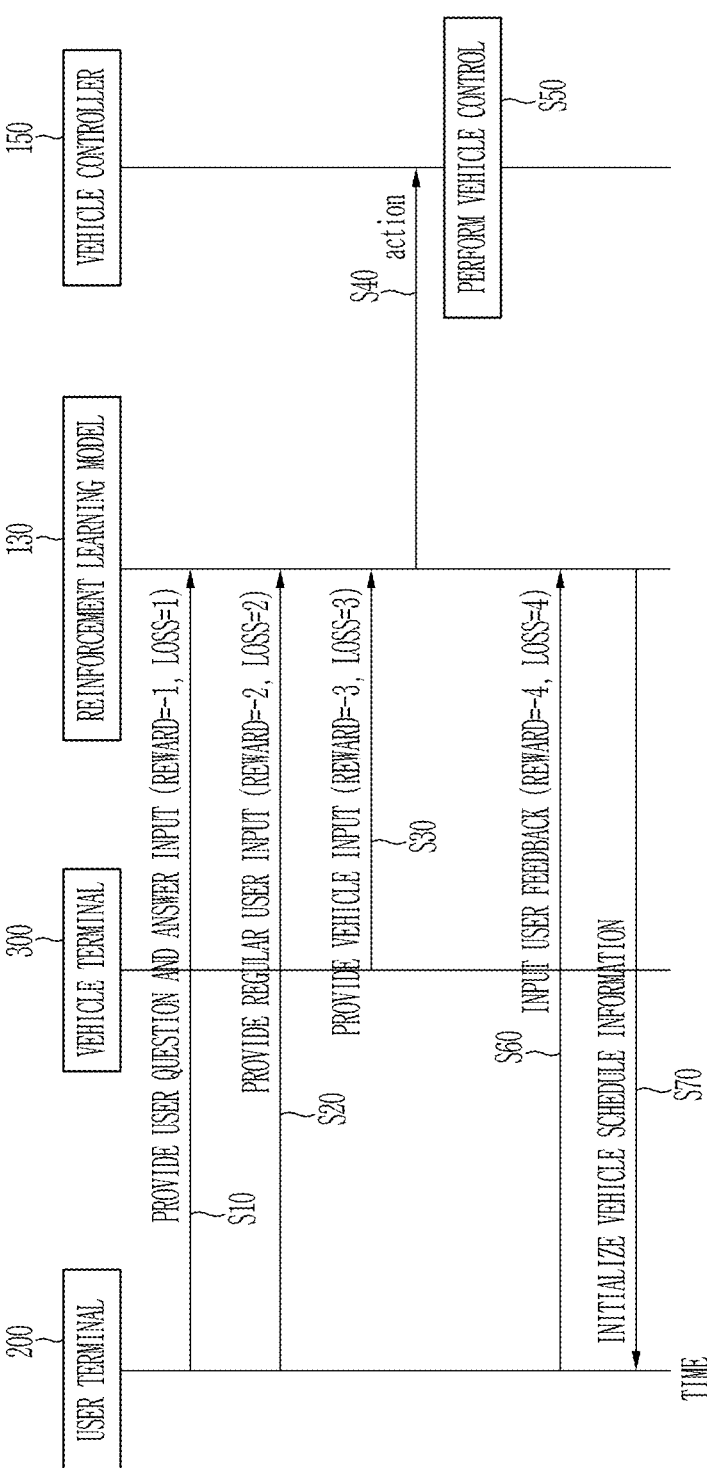
FIG. 4 is a view showing a vehicle control process by the smart vehicle control device according to an exemplary embodiment of the present disclosure.

FIG. 4 is a view showing a vehicle control process by the smart vehicle control device according to an exemplary embodiment of the present disclosure. The description arbitrarily assumes the reward and the loss shown in FIG. 4 for ease of explanation.

The reinforcement learning model 130 may provide the user with a question related to the vehicle driving preparation through the digital key application. For example, the reinforcement learning model 130 may provide the user with the question about setting of an air handling unit such as the air conditioner, media setting, or the vehicle boarding time before generating the initial vehicle control policy. The reinforcement learning model 130 may be configured to generate the initial vehicle control policy by reflecting the user answer to the above question.

Alternatively, the reinforcement learning model 130 may provide the user with the question and receive the answer through the user terminal 200 after generating the initial vehicle control policy (S10). When receiving the user answer to the question, the reinforcement learning model 130 may update the initial vehicle control policy by performing the learning based on a first state and a first reward, generated based on the received answer. The updated initial vehicle control policy may choose a first action that generates the first reward in the first state.

For example, the reinforcement learning model 130 may update the initial vehicle control policy to choose the first action having the first reward appearing as the largest reward when the first state is input. Here, the first reward may include a value less (for example, −1) than zero, and may include a value of zero when the reinforcement learning model 130 does not receive the user answer.

The reinforcement learning model 130 may update the initial vehicle control policy by performing the learning based on a second state and a second reward, generated based on the regular user input which is input in real time when receiving the real-time input through the digital key application. For example, the reinforcement learning model 130 may update the initial vehicle control policy by reflecting the input when receiving the input such as the change in the user destination or the change in the vehicle boarding time through the user terminal 200 (S20).

The reinforcement learning model 130 may update the initial vehicle control policy to choose a second action having the second reward, which appears as the largest reward, when the second state is generated based on the regular user input. Here, the second reward may be less (for example, −2) than the first reward, and may include the value of zero when the reinforcement learning model 130 does not receive the real-time user input.

The reinforcement learning model 130 may update the initial vehicle control policy by performing the learning based on a third state and a third reward, generated when receiving the vehicle input manually input by the user boarding the vehicle (S30). The reinforcement learning model 130 may update the initial vehicle control policy to choose a third action having the third reward which appears as the largest reward when the third state is generated if the user manually starts the engine at time different from a preset schedule. Here, the third reward may be less (for example, −3) than the second reward, and may include the value of zero when the reinforcement learning model 130 dose not receive the manual user input from the vehicle.

The reinforcement learning model 130 may be configured to generate the vehicle control policy for performing the optimal action based on the user input and the vehicle input (S40), and the vehicle controller 150 may be configured for controlling the vehicle based thereon (S50).

The reinforcement learning model 130 may update the vehicle control policy by performing the learning based on a fourth state and a fourth reward when the vehicle driving is finished and feedback related to the vehicle control is input through the digital key application of the user terminal 200 (S60). The reinforcement learning model 130 may update the initial vehicle control policy to choose a fourth action having the fourth reward, which appears as the largest reward, when the fourth state is generated based on the received user feedback. Here, the fourth reward may be less (for example, −4) than the third reward, and may include the value of zero when the reinforcement learning model 130 does not receive the user feedback.

The reinforcement learning model 130 may be configured to determine every reward to include the value less than zero. Furthermore, the reinforcement learning model 130 may be configured to determine a size of the first reward for the first state, which is the fastest state in the time order among the first state, the second state, the third state and the fourth state, to be the largest, and determine a size of the fourth reward for the fourth state, which is the latest state, to be the smallest. That is, a size of the reward may be inversely proportional to time.

The reinforcement learning model 130 may be configured to generate the final vehicle control policy based on the updated initial vehicle control policy, and initialize vehicle schedule information (S70). That is, the reinforcement learning model 130 may initialize the vehicle schedule information for the next vehicle control based on the vehicle control policy generated through the reinforcement learning.

The reinforcement learning model 130 may consider that an optimal customized vehicle control schedule is generated based on the user schedule when the initial vehicle control policy is the same as the final vehicle control policy. For example, the size of the reward may be gradually smaller when the plurality of states and the plurality of rewards are generated after the initial vehicle control policy is generated. The reinforcement learning model 130 may perform the reinforcement learning to maximize the size of the reward.

That is, the reinforcement learning model 130 may be configured to generate the vehicle control policy by repeatedly updating the initial vehicle control policy for the reward including the first, second, and third rewards to include the maximum value. The reward may include the maximum value when the reinforcement learning model 130 receives none of the user answer, the real-time user input, and the vehicle input after the initial vehicle control policy is generated.

In an exemplary embodiment of the present disclosure, the reinforcement learning model 130 may be configured to determine the initial vehicle control policy as the vehicle control policy when the loss calculated through the DQN includes the minimum value. The actual value Q-target of the vehicle control policy may be determined by reflecting the reward having the maximum value, and the predicted value Qpredict of each of the initial vehicle control policies may be determined by reflecting at least one of the first, second, and third rewards. Therefore, the loss corresponding to the difference between the actual value of the vehicle control policy and the predicted value of each of the initial vehicle control policies may include the value of zero which is the minimum value when the actual value of the vehicle control policy and the predicted value of each of the initial vehicle control policies are the same as each other.

A size of the loss may be proportional to the time. For example, the difference between the actual value and predicted value of the updated vehicle control policy may be 1 when the reinforcement learning model 130 receives the user question and answer. The loss of the updated vehicle control policy may be 2 when the reinforcement learning model 130 receives the regular user input, and the loss may be 3 when the reinforcement learning model 130 receives the vehicle control. The difference between the predicted value and actual value of the vehicle control policy updated when the reinforcement learning model 130 receives the user feedback after the vehicle driving is finished, may be 4.

That is, the loss may be the minimum value when the reinforcement learning model 130 receives none of the user question and answer, the regular user input, the vehicle input, and the user feedback.

FIG. 5 is a view showing an example of smart vehicle control according to an exemplary embodiment of the present disclosure. FIG. 6 shows an input or output screen of the user schedule according to an exemplary embodiment of the present disclosure.

In FIG. 5 and FIG. 6, schedule A is a schedule first input by the user through the digital key application, and schedule B may be a schedule newly generated by the repeated updates of the vehicle control policy.

As shown in FIG. 5, the reinforcement learning model 130 may be configured to generate a first control policy based on schedule A. When the destination is changed from A to B based on the real-time user input after generating the first control policy, the reinforcement learning model 130 may update the first control policy based thereon. The reinforcement learning model 130 may be configured to generate a second control policy when the driving is finished. The second control policy may set destination B based on the update.

The reinforcement learning model 130 may be configured to generate the schedule based on the second control policy. When the door opening time occurs 1 minute earlier due to the manual user input from the vehicle after generating the second control policy, the reinforcement learning model 130 may update the second control policy based thereon. The reinforcement learning model 130 may be configured to generate a third control policy when the driving is finished. The third control policy may reset the door opening time to 6:29 based on the update. The reinforcement learning model 130 may be configured to generate schedule B based on the third control policy.

FIG. 7 is a flowchart showing a smart vehicle control method according to another exemplary embodiment of the present disclosure. The smart vehicle control method may be performed by the smart vehicle control device. The description is provided with reference to FIG. 1, FIG. 2, and FIG. 3.

As shown in FIG. 7, the smart vehicle control device 100 may receive the user input, which is input through the digital key application from the user terminal 200, through the user input receiver 110 (S100). The user input may include the information related to the user schedule and daily pattern.

The smart vehicle control device 100 may use the reinforcement learning model 130 to generate the initial vehicle control policy for the vehicle driving preparation through the rule-based initial reinforcement learning based on the received user schedule information (S200).

The smart vehicle control device 100 may use the reinforcement learning model 130 to update the initial vehicle control policy through the reinforcement learning based on the regular user input, which is input through the digital key application, and the user manual manipulation input from the vehicle (S300). The reinforcement learning model 130 may include the deep Q network (DQN). The DQN may compare the actual value of an ideal vehicle control policy with the predicted value of the updated initial vehicle control policy, and perform the learning to minimize the loss corresponding to the difference. The reinforcement learning model 130 may consider that the loss includes the minimum value when the driving is finished without the user input or the vehicle input after generating the initial vehicle control policy. The reinforcement learning model 130 may update the vehicle control schedule based on the vehicle control policy when the loss includes the minimum value.

The smart vehicle control device 100 may be configured for controlling the vehicle based on the final vehicle control policy generated after repeating the update process (S400).

FIG. 8 is a flowchart showing the smart vehicle control method according to another exemplary embodiment of the present disclosure. FIG. 8 shows the steps of updating the initial vehicle control policy of FIG. 7.

As shown in FIG. 8, the smart vehicle control device 100 may ask the user the question related to the vehicle driving preparation through the digital key application, and update the initial vehicle control policy based on the first action predicted based on the first state and the first reward, generated based on the answer (S310).

The smart vehicle control device 100 may update the initial vehicle control policy based on the second action predicted based on the second state and the second reward when the user input or the vehicle input is generated (S320).

The smart vehicle control device 100 may be configured to determine the initial vehicle control policy as the final vehicle control policy when the user input or the vehicle input is generated not based on the repeated updates of the initial vehicle control policy (S330).

The smart vehicle control device 100 may update at least a portion of the vehicle control policy through the supervised learning based on the static factors including the vehicle information and the environmental information (S340).

Figure 9:
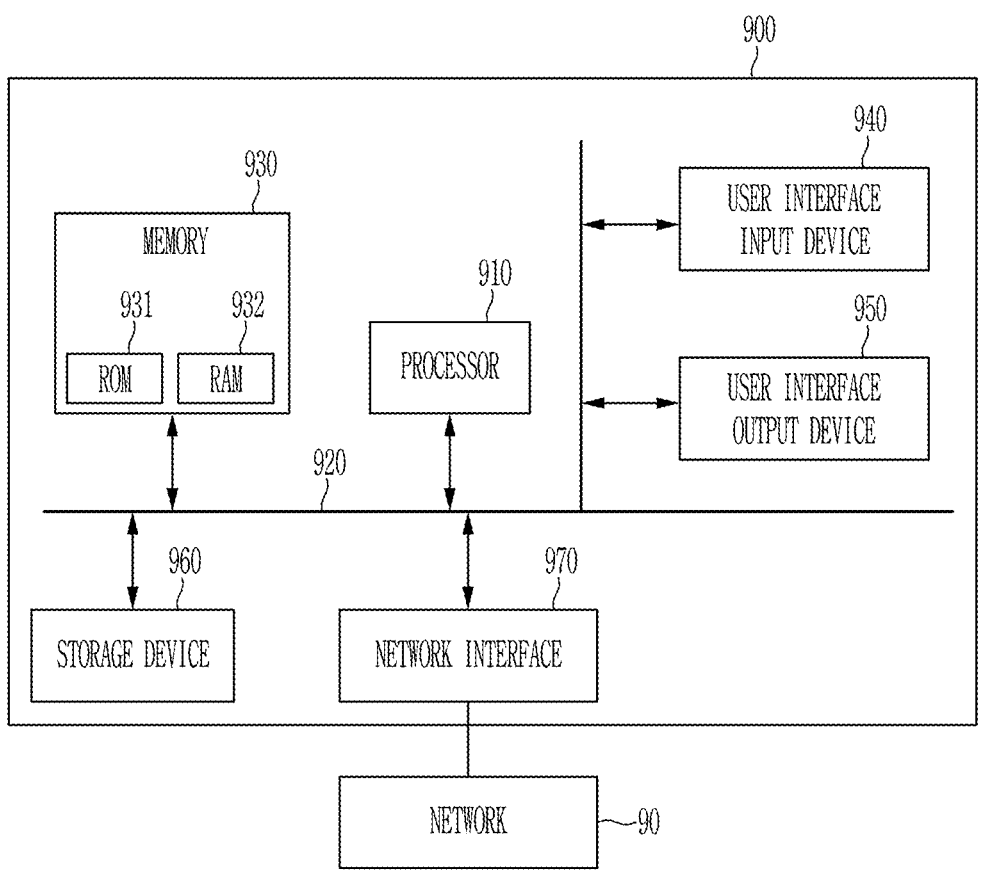
FIG. 9 is a view for explaining a computing device according to various exemplary embodiments of the present disclosure.

FIG. 9 is a view for explaining a computing device according to various exemplary embodiments of the present disclosure.

Referring to FIG. 9, the smart vehicle control device and method according to the exemplary embodiments of the present disclosure may be implemented using a determining device 900.

The computing device 900 may include at least one of a processor 910, a memory 930, a user interface input device 940, a user interface output device 950, and a storage device 960, performing communication through a bus 920. The computing device 900 may also include a network interface 970 electrically connected to a network 90. The network interface 970 may transmit or receive a signal with another entity through the network 90.

The processor 910 may be implemented in any of various types such as a micro controller unit (MCU), an application processor (AP), a central processing unit (CPU), a graphic processing unit (GPU), a neural processing unit (NPU), and the memory 930 may be any semiconductor device executing an instruction stored in the storage device 960. The processor 910 may implement the functions and methods described above with respect to FIG. 1, FIG. 2, FIG. 3, FIG. 4, FIG. 5, FIG. 6, FIG. 7, and FIG. 8.

The memory 930 and the storage device 960 may include various types of volatile or non-volatile storage media. For example, the memory may include a read only memory (ROM) 931 and a random access memory (RAM) 932. In the exemplary embodiment of the present disclosure, the memory 930 may be disposed inside or outside the processor 910, and may be connected to the processor 910 through various means that are well-known.

In various exemplary embodiments of the present disclosure, at least some components or functions of the smart vehicle control device and method according to the exemplary embodiments of the present disclosure may be implemented as programs or software executed by the computing device 900, and the programs or software may be stored in a computer-readable medium.

In various exemplary embodiments of the present disclosure, at least some components or functions of the smart vehicle control device and method according to the exemplary embodiments of the present disclosure may be implemented using hardware or circuitry of the computing device 900, or implemented using a separate device which may be electrically connected to the computing device 900.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have"

is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A smart vehicle control apparatus comprising:

one or more memory devices configured to store program codes; and one or more processors configured to execute the program codes to perform operations comprising:

receiving a user input from a user terminal through a digital key application;

receiving a vehicle input from a vehicle by a user boarding in the vehicle;

generating a vehicle control policy for vehicle driving preparation through a reinforcement learning model based on the user input and the vehicle input; and controlling the vehicle based on the vehicle control policy, wherein the generating a vehicle control policy for vehicle driving preparation through the reinforcement learning model comprising:

upon receiving a user answer to a question related to the vehicle driving preparation provided to the user through the digital key application, updating an initial vehicle control policy by performing reinforcement learning based on a first state and a first reward, generated based on the received answer, upon receiving a real-time user input related to the vehicle driving preparation through the digital key application, updating the initial vehicle control policy by performing the reinforcement learning model based on a second state and a second reward, generated based on the real-time user input, upon receiving the vehicle input which is input from the vehicle by the user boarding in the vehicle, updating the initial vehicle control policy by performing the reinforcement learning based on a third state and a third reward, generated based on the vehicle input, and generating the vehicle control policy by repeatedly updating the initial vehicle control policy for reward including the first, second, and third rewards to include a maximum value, wherein the first reward includes a value less than zero, the third reward is a minimum negative value, the second reward is a median negative value, and the first reward is a maximum negative value.

2. The apparatus of claim 1, further including updating at least a portion of the vehicle control policy through supervised learning model based on static factors including vehicle information and environmental information.

3. The apparatus of claim 2, wherein the updating at least a portion of the vehicle control policy through the supervised learning model based on static factors including vehicle information and environmental information comprising:

determining a first weight of the vehicle control policy for a schedule and a second weight of the vehicle control policy for each of the static factors, and updating the schedule only when the second weight is greater than the first weight.

4. The apparatus of claim 1, wherein generating a vehicle control policy for vehicle driving preparation through the reinforcement learning model based on the user input and the vehicle input comprising:

generating the initial vehicle control policy through rule-based modeling based on the user input including information on a user schedule and a user daily pattern.

5. The apparatus of claim 1, wherein the reinforcement learning model includes a deep Q network (DQN).

6. The apparatus of claim 5, wherein the generating a vehicle control policy for vehicle driving preparation through the reinforcement learning model based on the user input and the vehicle input further comprising:

performing the reinforcement learning to reduce a loss which is a difference between an actual value Q-target of the vehicle control policy which is calculated through the DQN and a predicted value Qpredict of each of the repeatedly updated initial vehicle control policies, and determining the initial vehicle control policy as the vehicle control policy in response that the loss includes a minimum value.

7. A smart vehicle control method performed by a computing device including a processor and a memory, the method comprising:

receiving, by the processor, a user input from a user terminal through a digital key application;

receiving, by the processor, a vehicle input from a vehicle by a user boarding on the vehicle;

performing, by the processor, reinforcement learning based on the user input and the vehicle input by use of a reinforcement learning model, and generating, by the smart vehicle control device, a vehicle control policy for vehicle driving preparation; and controlling, by the processor, the vehicle based on the vehicle control policy, wherein the performing, by the processor, the reinforcement learning based on the user input and the vehicle input by use of the reinforcement learning model, and generating, by the smart vehicle control device, a vehicle control policy for vehicle driving preparation comprising:

upon receiving a user answer to a question related to the vehicle driving preparation provided to the user through the digital key application, updating an initial vehicle control policy by performing the reinforcement learning model based on a first state and a first reward, generated based on the received answer, upon receiving a real-time user input related to the vehicle driving preparation through the digital key application, updating an initial vehicle control policy by performing the reinforcement learning based on a second state and a second reward, generated based on the real-time user input, upon receiving the vehicle input which is input from the vehicle by the user boarding in the vehicle, updating the initial vehicle control policy by performing the reinforcement learning based on a third state and a third reward, generated based on the vehicle input, and generating the vehicle control policy by repeatedly updating the initial vehicle control policy for reward including the first, second, and third rewards to include a maximum value, wherein the first reward includes a value less than zero, the third reward is a minimum negative value, the second reward is a median negative value, and the first reward is a maximum negative value.

8. The method of claim 7, further including updating at least a portion of the vehicle control policy through a supervised learning model based on static factors including vehicle information and environmental information.

9. The method of claim 8, wherein in the generating of the vehicle control policy, the initial vehicle control policy is generated by the reinforcement learning model through rule-based modeling based on the user input including information on a user schedule and a user daily pattern.

10. The method of claim 9, wherein the reinforcement learning model includes a deep Q network (DQN).

11. The method of claim 7, wherein the first reward includes a value of zero in response that the user answer is not received, the second reward includes a value of zero in response that the real-time user input is not received, and the third reward includes a value of zero in response that the vehicle input is not received.

12. The method of claim 11, wherein in the generating of the vehicle control policy, the initial vehicle control policy is determined as a final vehicle control policy in response that the reward including the first, second, and third rewards includes a maximum value, and the reward includes the maximum value in response that none of the user answer, the real-time user input, and the vehicle input is received.

13. The method of claim 12, wherein in the generating of the vehicle control policy, the reinforcement learning is performed to minimize a loss which is a difference between an actual value Q-target of the final vehicle control policy which is pre-calculated through the DQN and a predicted value Qpredict of the initial vehicle control policy which is predicted through the DQN.

* * * * *